Feb. 25, 1930.  A. N. NICKERSON  1,748,141
ROAD SPREADING MACHINE
Filed Oct. 11, 1927    5 Sheets-Sheet 2
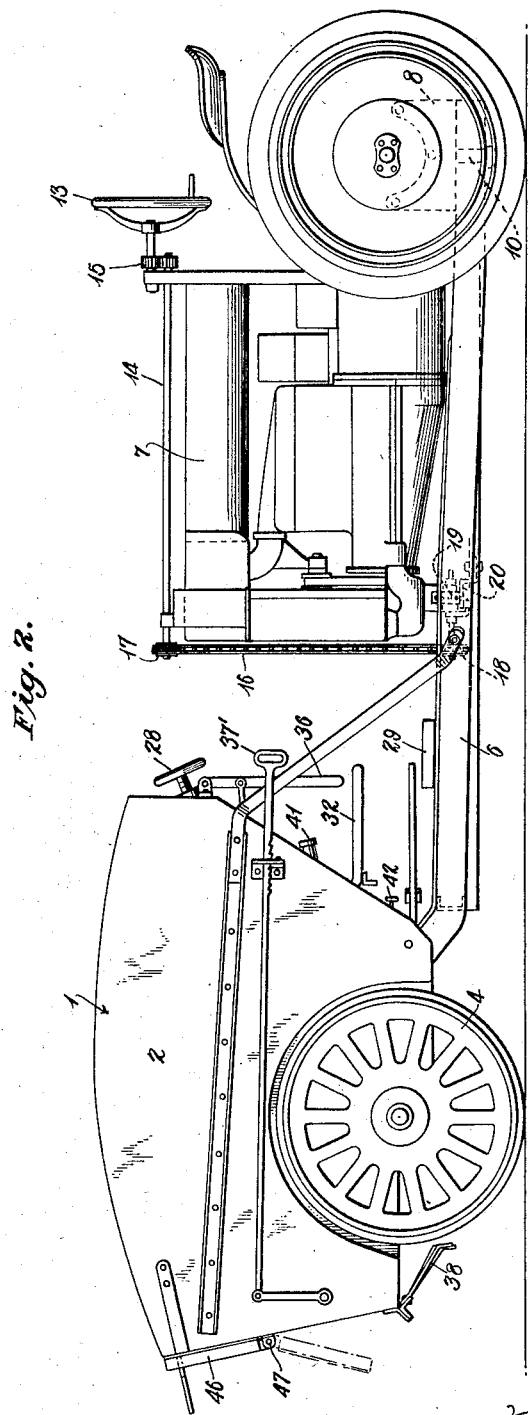
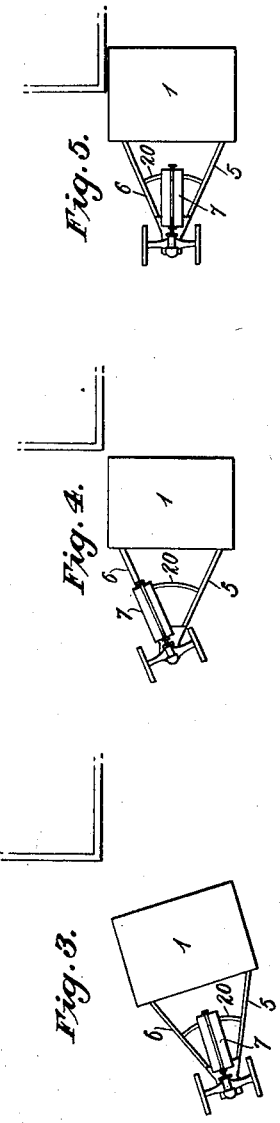
Inventor
A. N. Nickerson
By Bacon & Thomas
Attorneys

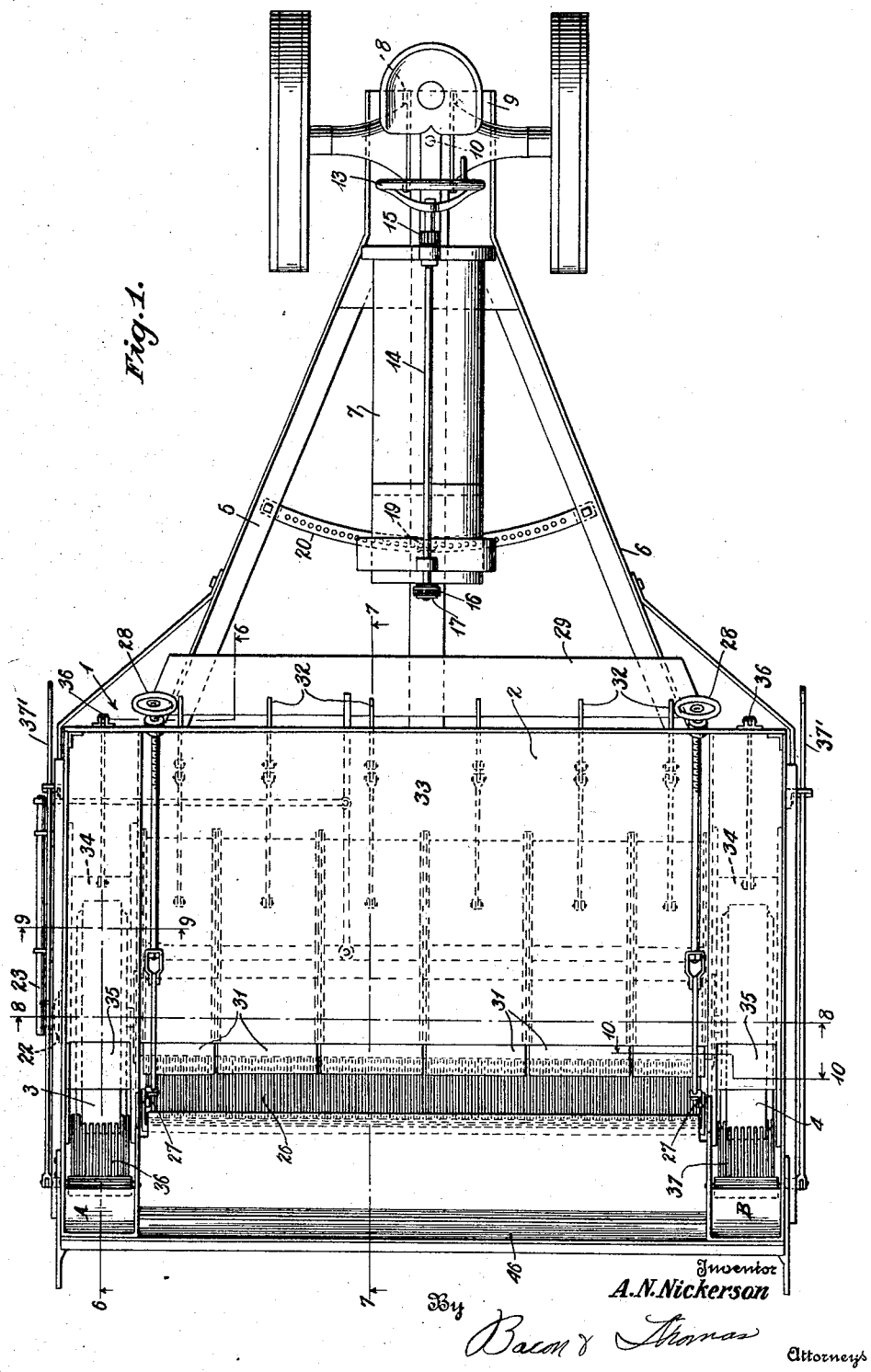

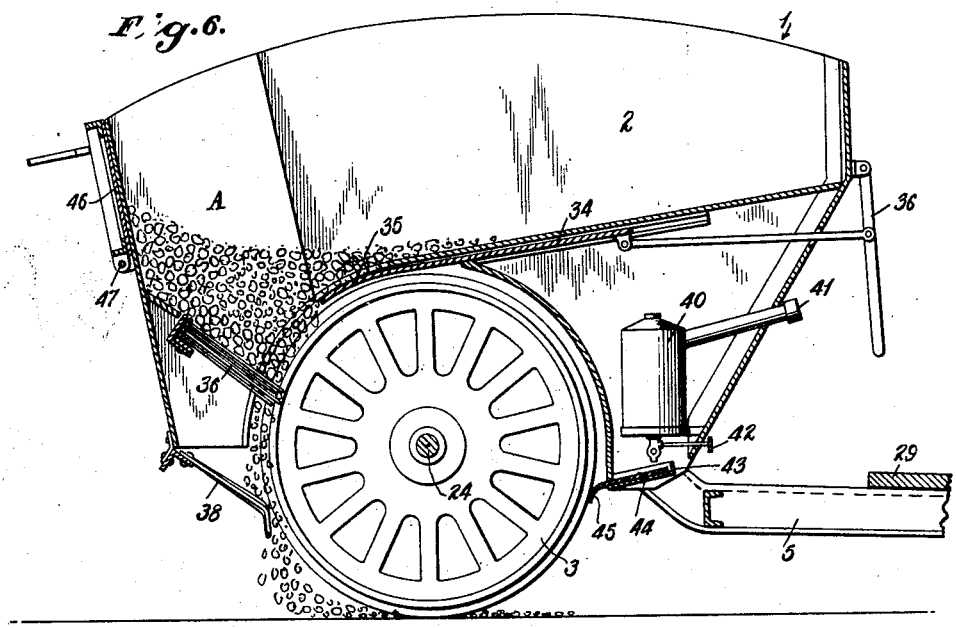
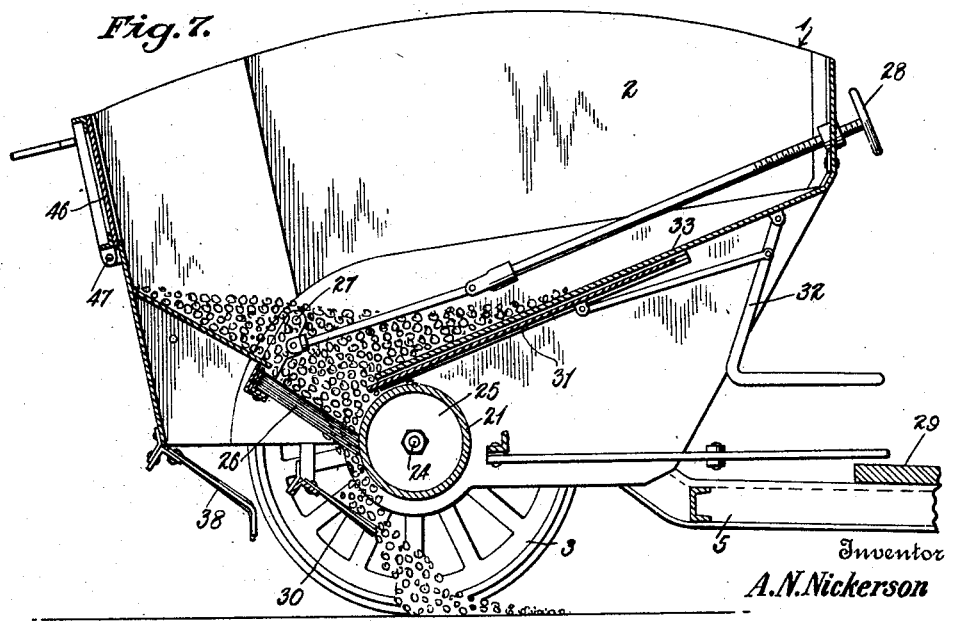

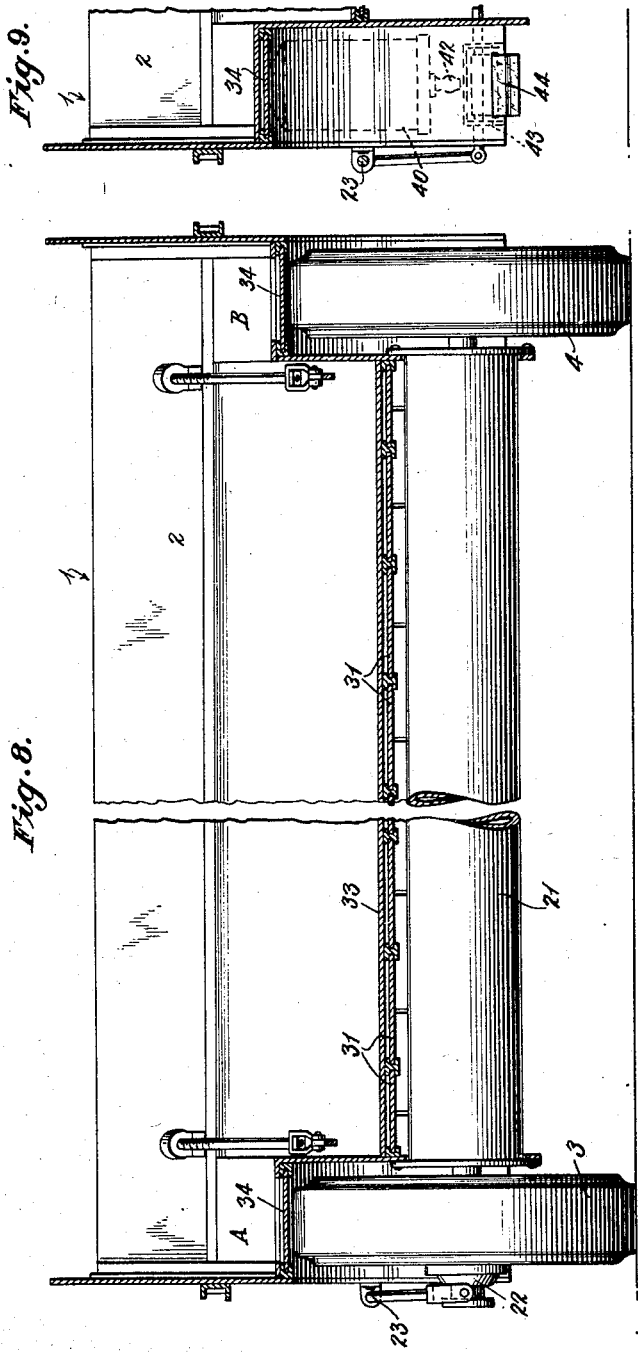

Feb. 25, 1930.  A. N. NICKERSON  1,748,141
ROAD SPREADING MACHINE
Filed Oct. 11, 1927   5 Sheets-Sheet 5
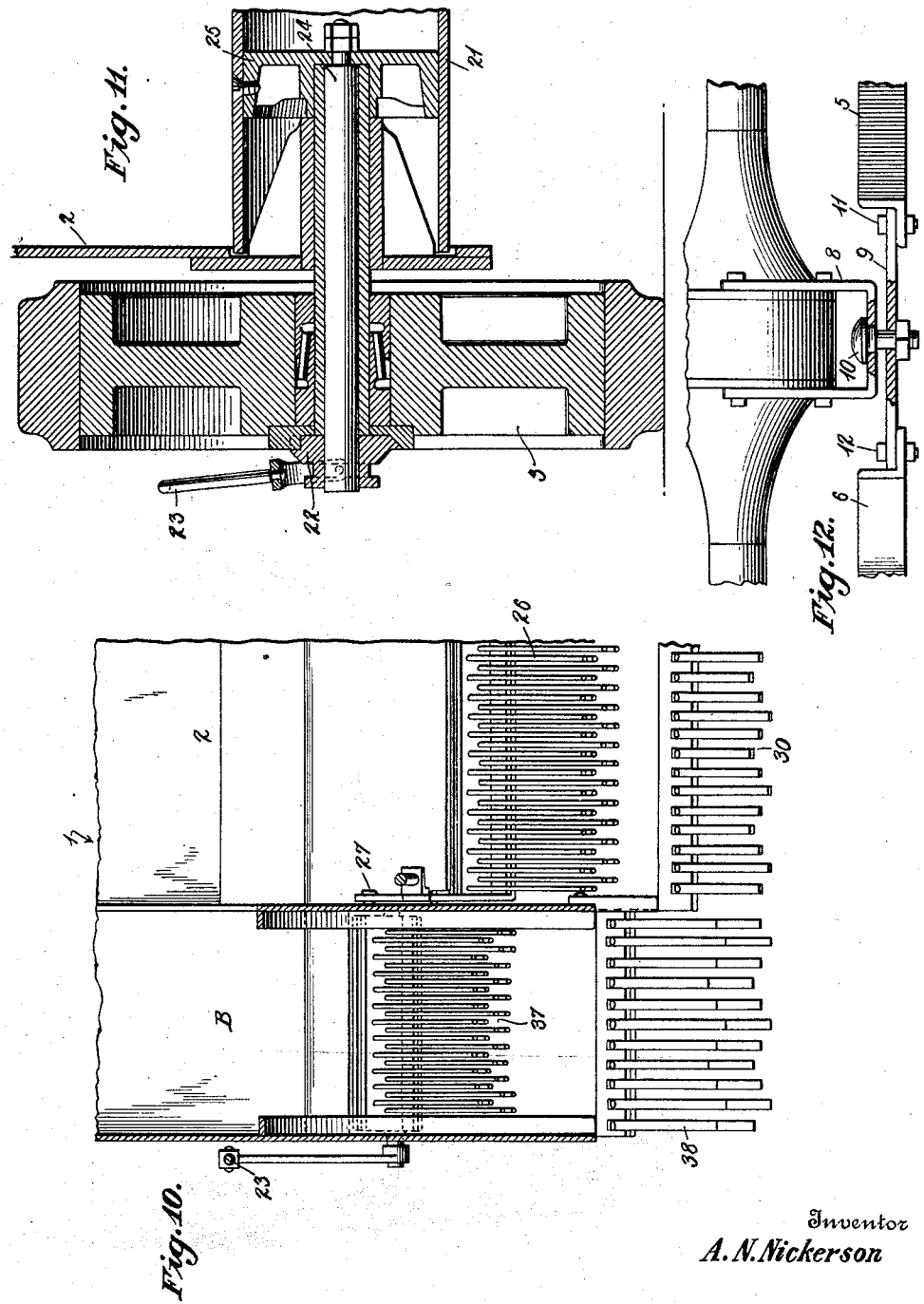
Inventor
A. N. Nickerson
By Bacon & Thomas
Attorneys Patented Feb. 25, 1930

1,748,141

UNITED STATES PATENT OFFICE

ALMA N. NICKERSON, OF NEW BEDFORD, MASSACHUSETTS, ASSIGNOR, BY MESNE ASSIGNMENTS, TO HIGHWAY SERVICE, INCORPORATED, OF NEW BEDFORD, MASSACHUSETTS, A CORPORATION OF MASSACHUSETTS

ROAD SPREADING MACHINE

Application filed October 11, 1927. Serial No. 225,574.

This invention relates to road surfacing machines for spreading sand or peastone or other granular materials or the like having means to evenly distribute the surfacing media in selective metered quantities.

An object of the present invention is to provide a road spreading machine with means for discharging variably metered quantities of the surfacing media to thereby optionally vary the thickness of the spread.

Another object of the invention is to provide an adjustable pivot brush which is angularly disposed with respect to the feed roll provided by the hopper, which brush is characterized by its ability to permit large pieces such as rocks or roots or the like to be discharged from the hopper without substantially disturbing the even thickness of the spread material on the surface of the road.

Another object of the invention relates to the provision of a plurality of independently adjustable shutters located within the confines of the hopper, which shutters are selectively operable to vary the width of the hopper outlet and thereby secure a distribution of the minerals on the road of any desired width.

Another object of the invention is to provide supplemental sets of adjustable brushes and shutters, functioning as aforesaid, for taking care of space occupied by the wheels of the spreader and by virtue of which the surfacing minerals or materials may be discharged from the entire width of the machine and in advance of the wheels thereof.

The invention further comprehends the idea of pivotally securing the spreader frame to the rear of the tractor in such a manner that the spreader is pushed ahead of the tractor as distinguished from being pulled thereby, thus serving to distribute the surfacing materials ahead of the tractor and preventing the wheels thereof from picking up tar, etc. Furthermore, by pivotally mounting the spreader frame to the rear of the tractor, a close coupling of the tractor and spreader is possible, and a considerable weight of the hopper is distributed to the rear driving wheels of the tractor.

A still further object of the invention is to provide a steering mechanism operable to swing the tractor relative to the spreader to change the angular position of the spreader irrespective of whether the tractor is in motion or not, if it is desired to utilize the spreader in restricted areas where close handling is necessary.

A still further object of the invention relates to the distributing plates located in a plane below the hopper outlet and which are staggeredly arranged with respect to one another which serve the function of vibrating the discharged minerals and aiding in securing a more uniform spread thereof on the road.

There are a multiplicity of subordinate objects of the invention which will be apparent to those skilled in the art from a reading of the following detailed description in conjunction with the drawings attached hereto and forming a part hereof wherein like reference numerals represent like parts, and in which Figure 1 is a top view of the apparatus, Figure 2 is a side elevation, Figures 3, 4, and 5 are schematic views showing the various adjusted positions of the hopper relative to the tractor, Figure 6 is a view partly in section showing particularly the hopper construction, Figure 7 is a similar view showing the shutter and brushes provided for the interior of the apparatus, Figure 8 is a transverse sectional view of the hopper with the shutters mounted thereon, Figure 9 is a detailed sectional view, Figure 10 is a top view partly in section showing the disposition of the brushes and vibrating fingers, Figure 11 is a detailed sectional view of the clutching mechanism, and Figure 12 is a detail of the tractor hitch.

Referring now more particularly to the drawings, 1 represents the spreader machine generally which is provided with downwardly inclining walls constituting a hopper 2. The spreader is supported by suitable wheels 3 and 4 and has a rearwardly extending frame consisting of side sills 5 and 6 converging in a rearward direction as shown. This spreader is attached to a tractor of any desirable make such as for example, the well known Fordson tractor indicated by reference numeral 7. In order to secure a close coupling of the tractor to the spreader and also to distribute considerable weight from the hopper to the tractor, the side sills 5 and 6 aforesaid are pivotally secured to the rear axle of the tractor as shown in Fig. 12. This pivotal arrangement consists merely of the U-shaped bracket 8 attached to the axle housing of the tractor and having a rockable plate 9 secured to the same by the bolt 10, which plate is fixedly secured to the side sills 5 and 6 as at 11 and 12. I provide means for changing the angular position of the tractor with respect to the spreader whereby it is possible to swing the tractor when in a stationary position to any desired point of travel illustrated schematically in Figs. 3, 4, and 5. This mechanism includes a hand wheel 13 positioned in proximity to the operator of the tractor and operable to rotate the shaft 14 through the gearing 15 causing a movement of the chain 16 mounted on the sprockets 17 and 18 respectively, causing a rotation of the pinion 19 secured to the tractor in any desired manner. In this connection, it will be observed that the front wheels of the tractor have been removed and the pinion 19 substituted therefor. The rotation of this pinion 19 by a movement of the wheel 13 as aforesaid causes the pinion to ride in an arcuate rack 20 whereby the tractor may be moved to any desired angular position with respect to the spreader, for instance, as shown in the detailed illustrations found in Figs. 3, 4, and 5.

The spreader is provided with a feed roller 21 cooperating with the outlet provided by the bottom of the hopper as shown particularly in Fig. 7. This feeding roll 21 is mounted over the fixed axle of the spreader as shown in Fig. 11 and may be brought into operative engagement by actuation of the clutch 22 by means of a suitable control lever 23 whereby the shaft 24 is rotated, moving the header 25 and consequently rotating the feed roller 21. This clutch is preferably of a "one-way" type, that is to say, it automatically disengages itself from the driving wheel upon an inadvertent backward movement of the spreader. If desired, it is possible to interchangeably use feed rolls of different characters according to the type of material being spread. 26 represents a brush which is angularly disposed with respect to the feed roll as shown full in Fig. 7. This brush is pivotally mounted to the hopper as at 27 and may be easily adjusted by the hand wheel 28 located within convenient reach of the operator on the platform 29. The brush is composed of bristles of any desirable material such as flat or round steel wire, ratan, or the like. It will be obvious that the brush may be adjusted from the feed roll to thereby vary the size or thickness of the coat applied to the road. The angular or inclined position of the brush forms a substantially V-shaped pocket for receiving the minerals and functions to crowd the minerals against the roll, thus causing the same to pass through the brush. The brush is further characterized by its capability of permitting large pieces such as rocks or roots or the like to pass through it without substantially disturbing the even spread of the material on the surface of the road. 30 represents what I term a distributor plate consisting of a series of staggeredly arranged spring fingers made of light spring metal. These are in a constant state of vibration during the operation of the machine and are adapted to receive the metered minerals and bounce them in all directions, thus aiding in the uniform spread of the material as actually applied to the road.

A very important characteristic of my invention relates to the shutters which are independently operable to control the discharge of minerals at any desired point on the road. These shutters are illustrated by reference numeral 31 and are selectively adjustable by control levers 32 mounted in proximity to the operator's platform 29. The shutters are supported by the inclined wall 33 of the hopper and normally overhang the feed roll 21 for the purpose of permitting the easy rotation of the feed roll. In other words, if the weight of the minerals rested entirely upon the feed roll 21, it would be very difficult to cause the rotation thereof.

It is highly important in the operation of dressing up the shoulders of roads that some means be provided for regulating the width of the material spread as it is not desirable to spread the material used for the shoulders on the road itself. This is easily accomplished by the selective control of the plurality of shutters provided by my invention. Furthermore, in country roads, which are covered with gravel, or other coarse material, it is possible with my invention to fill the ruts alone by manipulation of the shutters as aforesaid without building up the remainder of the surface of the road. Another example of the utility of the selective control of the width of the spread is as follows:

A tar distributor may spread a streak nine feet wide. If this is covered entirely, the next or overlapping streak of tar will be spread upon the already sanded surface, which is most undesirable as the tar will not form a proper bond and much of the value of the waterproofing or sealing coat is lost. With the present machine it is possible to cover eight feet of the nine and leave a foot of uncovered tar for the next course to lap over, thus forming a perfect bond.

In order to utilize the entire width of the spreader, I provide supplemental sets of slides, brushes, and distributor plates for taking care of the wheels of the machine. This arrangement is more clearly portrayed in Fig. 6, and comprises independently operable slides 34 having a curved portion 35 conforming to the shape of the wheel and operable by levers 36. It will be obvious that if it is desired to shut off the material from this point of the machine, it is only necessary to shove the lever inwardly, thus causing the slide 34 to close the passage for the minerals. These slides 34, as well as slides 31, may be operated to vary the size of the discharge opening in accordance with the necessitates of the occasion. I further provide supplemental brushes 37 on each side of the machine which engage the wheels 3 and 4 respectively for the purpose of supplying variably metered quantities of minerals. In this case the wheels 3 and 4 act as the feeding rolls. The supplemental brushes are pivotally arranged and angularly disposed with respect to the wheel, and are controllable by the lever 37' running along the side of the hopper as shown in Fig. 2. The hopper is shaped as shown in Fig. 8 for the purpose of providing elevated pockets A and B overhanging the wheels. Ordinarily, there will be a sufficient amount of minerals in these pockets A and B to take care of the spread at these points of the machine, but obviously any desired means may be employed for taking the minerals from the main portion of the hopper and delivering them to the pockets provided in the slides thereof. The supplemental distributor plates 38 are located below the brushes and function in the same manner as the main distributing device 30. By discharging the minerals by the supplemental brushes and distributor plates, the spread is applied in advance of the point where the wheels engage the surface, thus preventing the wheels from picking up substantial quantities of tar and of slipping. The supplemental brushes 34 are formed of bristles of differential lengths in order that the brushes will engage both the top and sides of the tires. As a further means of preventing tar from adhering to the wheels, I provide a tank for supplying a suitable solution such as kerosene. This is represented by reference numeral 40 having a filling spout 41 and a valvular control 42. The kerosene discharges into the tray 43 provided with a sheet of absorbent material 44 which applies the kerosene to the wheel as at 45. The hopper has a door 46 for permitting a loading therefrom from the front. The door is pivoted as at 47.

From the foregoing description, it will be apparent that the machine may be readily coupled to a suitable tractor by merely taking off the front wheels of the tractor and applying the sprocket pinion 19 thereto and pivotally mounting the rear ends of the wheels 5 and 6 to the rear axle of the tractor. This arrangement possesses the advantages above discussed. By virtue of the independently operable shutters, the width of the spread may be varied as desired according to the type of work necessary or materials used. On the other hand, the brushes are employed for the purpose of regulating the size or thickness of the coat. The supplemental brushes and shutters possess the advantages aforesaid, namely, using the entire width of the machine for discharging surfacing media if desired.

The term "hopper" as employed herein is intended to include any suitable receptacle for receiving the surfacing materials. The term "brush" is intended to include any device which will function substantially in the manner described and is not to be strictly limited to the conventionally known brush.

While I have shown and described one preferred embodiment of my invention, yet it is not my desire to be limited to the exact arrangement or construction of parts as I realize that these may be varied without departing from the spirit of my invention as expressed in the following claims.

What I claim is:

1. A road building machine comprising a hopper for receiving stone surfacing material having a transversely arranged discharge opening, means for feeding the stone surfacing materials from said opening, and a plurality of independent selectively operable shutters for controlling the width of the spread of stone surfacing material discharged from said opening.

2. A road surfacing machine comprising a hopper having a discharge opening, a feeding roller associated with said opening, an angularly disposed brush associated with the hopper and defining, with said roller, a substantially V-shaped pocket, and means for adjusting said brush with respect to the roller to vary the thickness of the discharged coat of surfacing media.

3. A road surfacing machine comprising a hopper having a discharge opening, a feeding roller associated with said opening, an angularly disposed brush associated with the hopper and defining, with said roller, a substantially V-shaped pocket, and means for adjusting said brush with respect to the roller to vary the thickness of the discharged coat of surfacing media, and means comprising a shutter surmounting the roller and normally overhanging the same for varying the width of the spread.

4. A road surfacing machine for spreading minerals on tarred surfaces of roadways comprising a hopper having a discharge opening, a feeding device associated with the opening, means for varying the width of the material spread comprising a plurality of independently operable shutters overhanging the feeding device and adapted to be moved to positions where they close selected portions of the opening provided by the hopper.

5. A road spreading machine comprising a hopper having a transverse opening provided with a feeding roller for discharging minerals from the hopper on the roadway, a member cooperating with the feeding roller for varying the thickness of the spread, and a series of shutters selectively operable to shut off any portion of said transverse opening.

6. A road spreading machine comprising a hopper having an opening, a feed roller cooperating with said opening, and adjustable means for varying the thickness of the material spread, said hopper being provided with supplemental discharge opening overhanging the wheels of the spreader, whereby the full width of the machine may be utilized for spreading materials, adjustable devices associated with the supplemental openings for varying the discharge of material therefrom.

7. A road spreading machine comprising a hopper provided with a main transverse discharge opening for discharging minerals on the road surface, said hopper being provided with pockets in the sides thereof overhanging the wheels and having discharge openings leading therefrom, and means associated with said hopper for controlling the openings.

8. A road spreading machine for supplying granular minerals to roadways, comprising a hopper having a discharge opening, of a feeding roller mounted in proximity to said opening, an adjustable member operable to vary the thickness of the coating discharged by said feeding roller, supplemental pockets formed in the hopper overhanging the wheels and provided with openings located in proximity to said wheels and whereby the wheels function as feeding devices, means associated with said wheels and adjustable with respect thereto for varying the thickness of the material spread thereby.

9. A road spreading machine for supplying granular minerals to roadways, comprising a hopper having a discharge opening, of a feeding roller mounted in proximity to said opening, an adjustable member operable to vary the thickness of the coating discharged by said feeding roller, supplemental pockets formed in the hopper overhanging the wheels and provided with openings located in proximity to said wheels and whereby the wheels function as feeding devices, means associated with said wheels and adjustable with respect thereto for varying the thickness of the material spread, and shutter devices for selectively cutting off the discharge of the minerals and varying the width of the spread on the road.

10. A road spreading machine comprising a hopper having an opening with a feed roller associated therewith, means cooperating with the roller for varying the size of the coating discharged thereby, a vibratory distributor plate located below the feed roller and operable to vibrate the discharged minerals to secure an even distribution thereof prior to the delivery of the minerals on the roadway.

11. A road spreading machine comprising a receptacle for receiving substantial quantities of minerals to be automatically supplied to the roadway, a discharge opening provided by the receptacle, a feeding roller cooperating with the opening to discharge minerals from the receptacle, an inclined brush variably engageable with the roller for regulating the thickness of the spread minerals, and defining with the roller a substantially V-shaped pocket for receiving portions of the minerals, a plurality of inclined shutter devices having portions thereof surmounting the roller to relieve the roller of the weight of the minerals on the shutter to thereby permit its free rotation, said shutters being independently actuatable whereby to vary the width of the spread on the roadway.

12. A road spreading machine comprising an axle having wheels thereon, a roller mounted on said axle and disposed in proximity to the opening provided by the hopper of the machine, clutch means for connecting the roller to the wheels for permitting rotation thereby, a brush associated with the hopper and engageable with the roller, and means for adjusting the brush to vary the thickness of the coat of material spread upon the roadway.

13. A road spreading machine comprising an axle having wheels thereon, a roller mounted on said axle and disposed in proximity to the opening provided by the hopper of the machine, clutch means for connecting the roller to the wheels for permitting rotation thereby, a brush associated with the hopper and engageable with the roller, and means for adjusting the brush to vary the thickness of the coat of material spread upon the roadway, a plurality of incliningly disposed sliding shutter devices associated with the hopper and overhanging the roller, operating levers secured to said sliding shutters operable to vary the width of the material spread.

14. A road spreading machine comprising a wheeled hopper having a discharge opening for supplying minerals to tarred surfaces, means for feeding the mineral from the hopper, and means for continuously supplying kerosene or similar substances to the wheels of the hopper to prevent adherence of tar to said wheels.

15. A road surfacing machine comprising a wheeled hopper for receiving the minerals to be discharged to the tarred surface of the roadways, means for supplying minerals to the roadway at a point in advance of the point of attraction of the wheels on the road, said means comprising a hopper having a discharge opening located in proximity to a point to the wheels of the machine, said wheels constituting a means for feeding the minerals from the discharge opening, and brushes associated with the hopper and engageable with said wheels, said brushes being adjustable whereby to vary the thickness of the coat being spread by the wheels.

16. A road spreading machine comprising a hopper having a transverse opening therein, means for feeding minerals from said opening and a plurality of independent selectively operable shutters for controlling the width of the spread discharged from said opening and means for varying the thickness of the spread.

17. A road building machine providing a hopper for containing stone surfacing material having a discharge opening, an angularly disposed brush associated with said hopper and forming with said hopper a pocket portion, means for adjusting said brush relatively to the opening to vary the thickness of the discharged coat of surfacing media.

18. A road surfacing machine to supply minerals to tarred surfaces of roadways comprising a wheeled hopper having discharge openings positioned in proximity to the wheels of the hopper, said wheels cooperating with the openings of the hopper and functioning as feeding devices for the minerals therefrom to discharge the same at a point in advance of the wheels of the hopper to prevent adherence of tar to the wheels.

19. A road surfacing machine of the character described comprising a hopper having a transverse opening therein, a feeding roller associated with said opening for feeding surfacing materials from the hopper and discharging them in the form of a spread upon the roadway, means for varying the thickness of the spread upon the roadway, said means comprising an angularly disposed flexible element engaging the roller with means for varying its pressure upon the roller, said flexible element possessing the capability of permitting the passage of relatively large particles of extraneous materials therethrough at any transverse point of said opening provided by the hopper without substantially effecting the even distribution of the spread at other points of the opening.

20. A road spreading machine of the character described comprising a hopper having discharge openings, a roller associated with said opening, a brush-like element having flexible fingers engaging the roller, means for varying the pressure of the brush fingers on the roller to thereby vary the thickness of the spread, and means for supporting a substantial portion of the minerals within the hopper to prevent the weight thereof from substantially interfering with the free rotation of the feed roller.

21. A road spreading machine comprising a hopper having a feed roller associated therewith for discharging minerals as a film to the roadway, means for varying the thickness of the spread, said means comprising an adjustable flexible element engaging the feed roller with varying pressure thereagainst, means for varying the pressure of the flexible element on the roller at one point relative to its pressure on another point whereby the thickness of the spread at one point of the road may be varied relative to another point.

22. A road building machine of the character described comprising a hopper adapted to be mounted in advance of a tractor and pivotally connected thereto comprising a hopper for receiving stone surfacing material and the like, means for discharging the stone surfacing material from the hopper, means for varying the width thereof, control levers associated with the said last two mentioned means, a platform in close proximity to the hopper, said control levers being operable within reach from the platform whereby the thickness of the spread or the width thereof, may be varied during the transit of the machine over the roadway.

23. A road building machine for spreading stone on tarred surfaces of roadways and the like comprising a hopper for receiving stone surfacing material, wheels for supporting said hopper, a feed roller rotatable with the wheels, means cooperating with the said roller for adjusting the thickness of the stone spread upon the roadway, a tractor connected with said hopper for pushing the same and means for changing the angular position of the tractor relative to the hopper.

24. A road building machine for spreading stone on tarred surfaces of roadways and the like, comprising a hopper for receiving stone surfacing material, wheels for supporting said hopper, a movable feed roller cooperating with the bottom of said hopper for discharging stone surfacing material therefrom, means for varying the thickness of the stone spread upon the roadway, a tractor pivotally connected with said hopper for pushing the same and means for changing the angular positions of the tractor relative to the hopper.

In testimony whereof I affix my signature.

ALMA N. NICKERSON.